Figure 1:
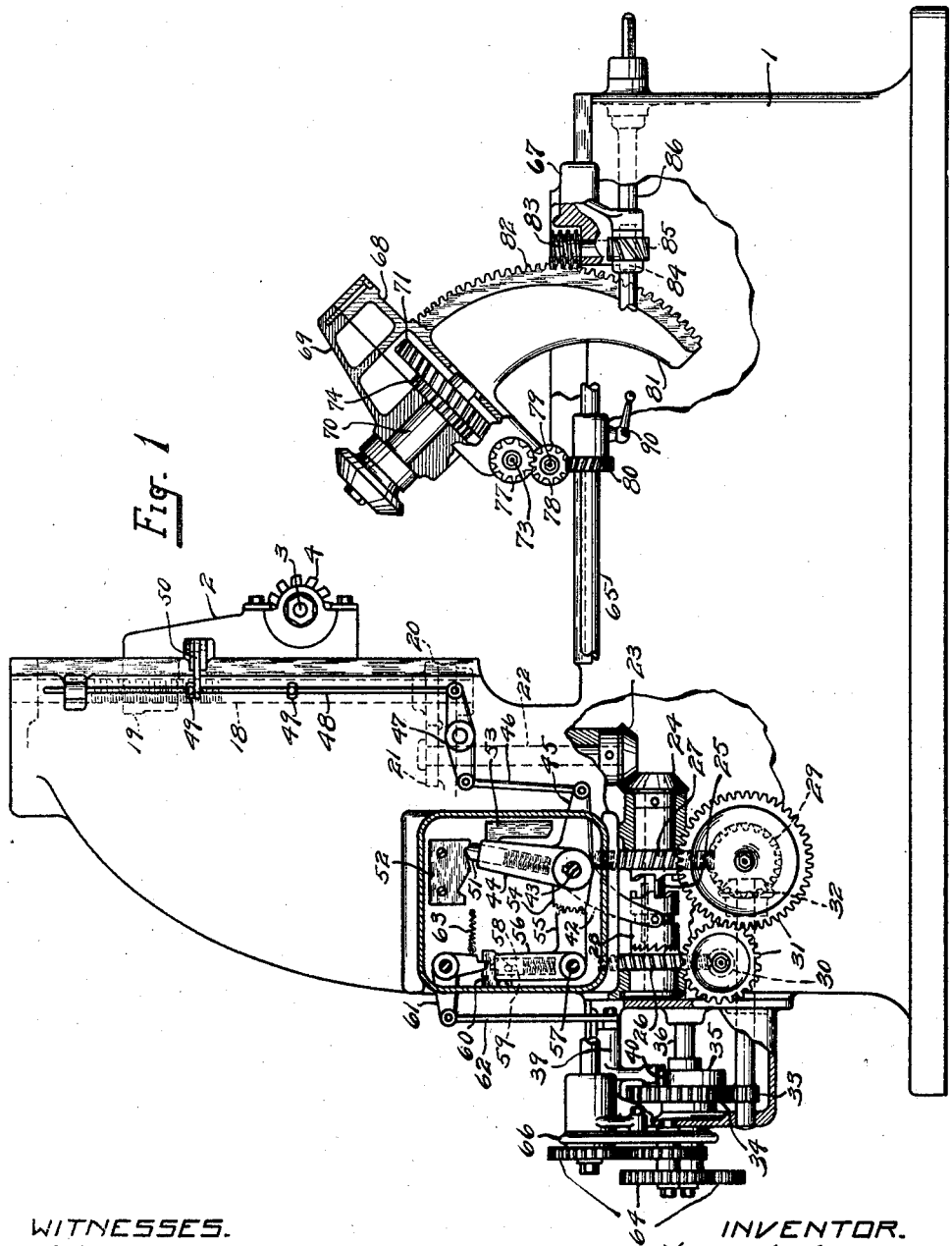

F. L. EBERHARDT.
MULTIPLE GEAR CUTTING MACHINE.
APPLICATION FILED DEC. 3, 1910.

1,030,291.

Patented June 25, 1912.

3 SHEETS—SHEET 1.

WITNESSES.
B E Barnes
Joseph Cesar

INVENTOR.
Frederick L. Eberhardt
BY Wm H Zimmermann
ATTORNEY.

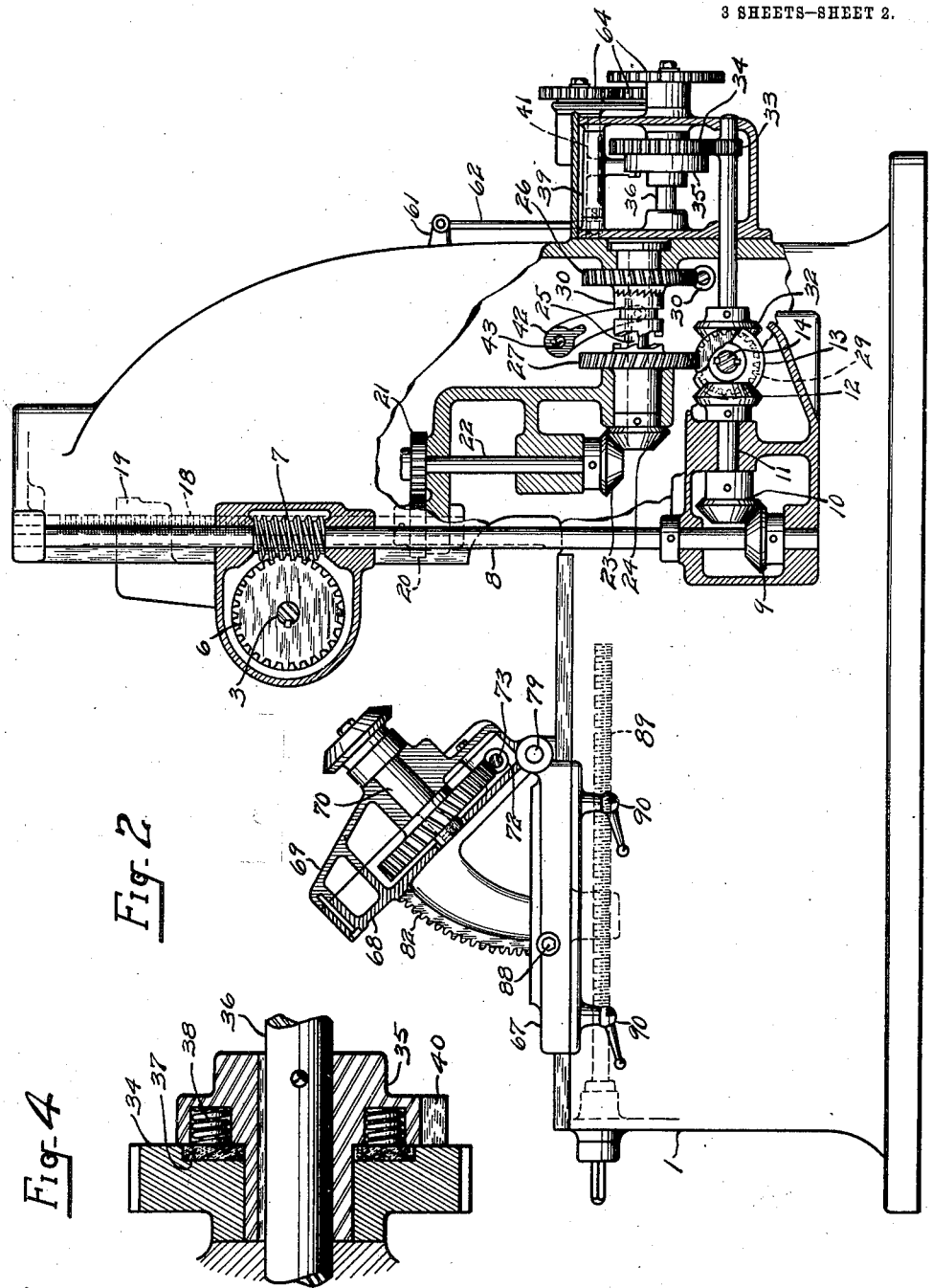

F. L. EBERHARDT.
MULTIPLE GEAR CUTTING MACHINE.
APPLICATION FILED DEC. 3, 1910.
1,030,291.
Patented June 25, 1912.
3 SHEETS—SHEET 3.
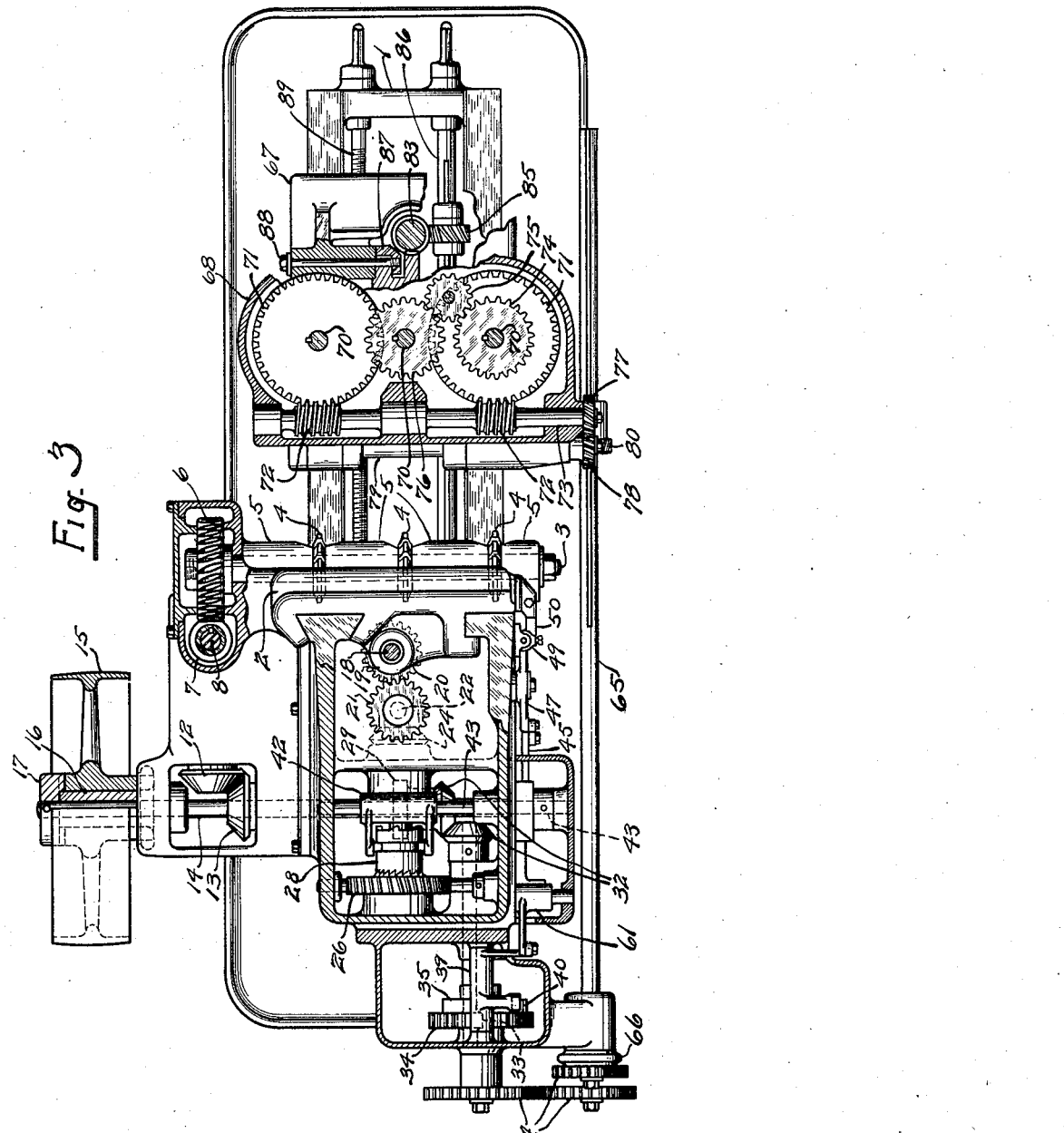
WITNESSES.
B.E. Barnes.
Joseph Cesar
INVENTOR.
Frederick L. Eberhardt
BY Wm. H. Zimmermann.
ATTORNEY.

UNITED STATES PATENT OFFICE.

FREDERICK L. EBERHARDT, OF NEWARK, NEW JERSEY, ASSIGNOR TO GOULD & EBERHARDT, OF NEWARK, NEW JERSEY, A CORPORATION OF NEW JERSEY.

MULTIPLE-GEAR-CUTTING MACHINE.

1,030,291.

Specification of Letters Patent. Patented June 25, 1912.

Application filed December 3, 1910. Serial No. 595,358.

*To all whom it may concern:*

Be it known that I, FREDERICK L. EBERHARDT, a citizen of the United States, and a resident of the city of Newark, in the county of Essex and State of New Jersey, have invented certain new and useful Improvements in Multiple-Gear-Cutting Machines, and do hereby declare the following specification, taken in connection with the drawings forming a part of the same, to be a full, clear, and exact description of the principle of said invention and the best mode in which I have contemplated applying that principle, so as to distinguish it from other inventions.

The invention relates primarily to that class of machines exemplified by a milling or gear cutting machine, and more particularly to that type of machine for cutting the teeth of spur, bevel and worm gears and clutches.

The object of this invention is to provide a machine in which the teeth of a series of gear blanks may be simultaneously cut automatically.

Another feature of this invention relates to its adaptability to readily cut either a series of spur, bevel or worm gears or clutches.

The invention comprises a series of work-holders with means to angularly adjust same, a cutter spindle, having a series of cutters mounted thereon, means to rotate and reciprocate said cutters with relation to said work-holders, an indexing mechanism, connections therefrom to said work-holders, whereby said work-holders are indexed at the end of each cycle of reciprocations of said cutters, and means to control said reciprocating and indexing means.

The annexed drawings and the following description set forth in detail certain mechanism embodying means constituting however, but one of the various mechanical forms in which the principle of the invention may be used.

The novelty of the invention will be readily understood from the drawings which illustrate the invention in its preferred form as applied to a gear cutting machine, and from the following description thereof. The novelty will be more particularly pointed out in the claims annexed to said description.

Referring to the drawings: Figure 1 is a side elevation of a gear cutting machine, embodying the invention, partly in section, to clearly illustrate the internal construction: Fig. 2 is also a side elevation of the same, but opposite to that of Fig. 1, and also partly in section. Fig. 3 is a plan view partly in section, and Fig. 4 is a sectional view of the indexing clutch.

Referring to the various figures; upon the vertical portion of the base 1, is mounted a reciprocating cutter carriage 2, in which a cutter spindle 3 is rotatably mounted. A series of cutters 4 are secured to said spindle 3 between a series of bearings 5. The cutter spindle 3 is rotated by a worm wheel 6 secured thereto, and driven by the worm 7, which is slidably keyed to the vertical shaft 8. A bevel gear 9 is secured to the lower end of the vertical shaft 8 and meshes with a bevel gear 10 secured to a short shaft 11 upon the other end of which the bevel gear 12 is secured which meshes with the bevel gear 13, secured to the main shaft 14. The main shaft 14 is mounted traversely in the frame 1 and receives rotary motion from a pulley 15, mounted on a hub 16, and transmitting motion to said shaft 14 through the flange 17, secured to said shaft and keyed to the pulley 15.

The feeding mechanism consists of a feed screw 18, engaging a threaded portion 19 of the cutter carriage 2. A gear 20 is secured to the lower end of the feed screw 18 meshing with a gear 21 secured to the shaft 22, to the lower end of which shaft the bevel gear 23 is secured, which meshes with the bevel gear 24, secured to and rotatable with the reversing shaft 25. Two helical gear wheels 26 and 27 respectively, are loosely mounted on said reversing shaft 25 and rotate in opposite directions and each is provided with clutch teeth on their opposing faces. A reversing clutch 28 is slidably keyed to said reversing shaft 25 and arranged to engage either of said helical gear wheels and be rotated thereby.

The helical gear 27 is rotated at a constant speed by the gear 29 secured to and rotatable with the main shaft 14 and is to retract the cutter carriage. The gear 26 is rotated opposite to the gear 27 by the worm 30 which receives its motion from the main shaft 14 through the change speed gears 31. This gear 26 rotates comparatively slow and is for feeding the cutter carriage 2.

The indexing mechanism for the work-holders comprises a friction clutch mechanism, shown in Fig. 4, which is rotated from the main shaft 14 through the bevel gears 32 and the pinion 33, which meshes with and constantly rotates the clutch gear 34. The clutch disk 35 is secured to the index drive shaft 36 and has loosely mounted thereon, the clutch gear 34 which tends to rotate said disk 35 through the friction leathers 37, which are under the tension of the springs 38. The disk 35 is prevented from rotating through the frictional contact with the clutch gear 34, by the index lever 39, which engages a projection 40 on said disk 35. The index lever 39 is pivotally mounted on the rock shaft 41 and is operated by the return movement of the cutter carriage which unlocks the friction clutch through the levers and rods now to be described in detail.

The feeding and retracting movements of the cutter carriage 2 are controlled by a series of levers and rods connecting said carriage to the reversing clutch 28. A forked lever 42 engages a circular groove in the reversing clutch 28, to move same either to the retracting or feeding position, and is secured to a rock shaft 43 to which a reversing lever 44 is also keyed. The reversing lever 44 is provided with an arm 45 having attached thereto, a rod 46 which is secured to one end of the lever 47. The trip or tappet rod 48 is attached to the other end of said lever 47 and is provided with two adjustable tappet dogs 49, thereon, between which the projection 50 of the carriage 2 is arranged to operate. The tappet dogs 49 can be adjusted to any suitable position on the tappet rod 48 and determine the precise point of reversal of the motion of the cutter carriage; the lower dog limiting the downward or feed motion and the upper dog limiting the retracting motion. A spring pressed plunger 51 is provided in the reversing lever 44 and engages with a double inclined cam plate 52 to rapidly reverse the motion of the cutter carriage 2. A stop 53 is provided to limit the movement of said reversing lever 44 in either direction.

The indexing mechanism is controlled by the movements of the reversing lever 44, which is provided with a gear sector 54 engaging with a similar sector 55 on the index plunger lever 56, which is pivoted on the shaft 57. A spring plunger 58 is arranged in the index plunger lever 56 and is provided with a pin 59 engaging a cam plate 60, whereby said plunger 58 may be rapidly moved longitudinally out of engagement with the lever 61. The plunger 58 is arranged to operate a bell crank lever 61 which is connected to the index lever 39 by the rod 62, to unlock the indexing mechanism upon the return movement of the cutter carriage. The bell crank lever 61 is also provided with a tension spring 63 to actuate said lever in one direction, thereby locking the indexing mechanism when said plunger 58 is withdrawn from engagement with said bell crank lever by means of the cam plate 60.

The work-holders, which are periodically actuated through the change speed gears 64 arranged between the index drive shaft 36 and the index shaft 65, and are provided with a swinging arm 66 to accommodate variously sized change speed gears, will now be described in detail.

An adjustable slide 67 is mounted on the horizontal portion of the frame 1 and has hinged to one end thereof, the tilting bed 68 provided with a cap 69 in which the revoluble spindles that hold the gear blanks to be cut, are arranged. The two end work-holders are each provided with a worm wheel 71 which mesh with and are rotated by the worms 72, each preferably integral with the worm shaft 73. The central work holder receives rotary motion from an end work-holder and in the same direction through the three spur gears 74, 75 and 76. The spur gear 74 is secured to the end work-holder and the gear 76 is secured to the central work-holder, while the gear 75 merely acts as an intermediate gear which can be dispensed with entirely, if it were not desirable to have all the work-holders rotate in the same direction. The worm shaft 73 has secured to one end thereof, the helical gear 77, meshing with the helical gear 78, loosely mounted on the hinge shaft 79. The hinge shaft gear 78 in turn meshes with, and is rotated by the helical gear 80, slidably keyed to the index shaft 65, which shaft is mounted at right angles to said hinge shaft 79.

The work holders 70 can be adjusted angularly by means of a segment 81, preferably integral with the tilting bed 68 and provided with gear teeth 82. A worm 83 is arranged to mesh with the segmental gear teeth 82 to angularly adjust the work holders 70. A helical gear 84 is secured to the worm 83 and meshes with and is rotated by the helical gear 85, slidably keyed to the adjusting shaft 86, extending through the forward end of the frame and is provided with a square end to receive a crank handle. When the work-holders have been properly adjusted, the segmental arm 81 is then secured to the slide 61 by the strap 87 and bolt 88. The work carriage can also be adjusted toward or away from the cutters 4 by means of the screw 89 and is then clamped in the adjusted position by the clamp handles 90.

The operation of the mechanism is as follows: The gear blanks are secured to the work-holders in the usual way; the tilting bed is adjusted to the proper position both longitudinally and angularly if the blanks to be cut are bevel gears. The tilting bed is clamped to the slide and the latter is clamped to the frame. The cutters are then secured to the spindle in proper relation to the work, and the proper change speed gears for the indexing and feed are placed in position. The machine can then be started by giving motion to the pulley. The cutters feed downward until the lower tappet dog is in contact with the projection on the cutter carriage. The reversing clutch is thereby thrown from the feeding position (as seen in Fig. 1) to the retracting position. The cutters return until the upper tappet dog is actuated to reverse the motion and again start the feeding motion of the cutters. Just before the completion of the retracting movement, the indexing mechanism is unlocked and the work indexed for one tooth. If it is desired to cut a series of worm wheels, the index lever is held from engaging the clutch disk, and the clutch gear and disk are bolted together, thus imparting continuous motion to the work holders. The reversing clutch can be disconnected from the forked lever and placed in a neutral position, and the work can be fed toward the cutters by means of the slide adjusting screw.

Having described my invention and its mode of operation, I claim as new and desire to secure by Letters Patent:

1. In a gear cutting machine, the combination with a revoluble cutter spindle, a series of cutters mounted thereon, an angularly adjustable work carriage, a series of work spindles rotatably mounted therein, means to reciprocate said cutters and means to index said work spindles after each excursion of said cutters.

2. In a gear cutting machine, the combination with a revoluble cutter spindle, a series of cutters mounted thereon, an angularly adjustable work carriage, a series of work spindles rotatably mounted therein, means to reciprocate said cutters, and means to index said work spindles after each excursion of said cutters, comprising an index shaft, a shaft at right angles thereto, connections between shafts and other connections between said shaft and work spindles.

3. In a gear cutting machine the combination with a revoluble cutter spindle, a series of cutters mounted thereon, means to reciprocate said cutters, an angularly adjustable work carriage, a series of work spindles rotatably mounted therein, an indexing mechanism and connections therefrom to said work spindles.

4. In a gear cutting machine the combination with a revoluble cutter spindle, a series of cutters mounted thereon, means to reciprocate said cutters, a work slide, an angularly adjustable bed hinged to said slide, a hinged shaft, a series of work spindles rotatably mounted in said hinged bed, an indexing mechanism, a shaft, connections therefrom to said work-holders and other connections to said hinge shaft, and connections from said hinge shaft to said indexing mechanism.

5. In a gear cutting machine, the combination with a revoluble cutter spindle, a series of cutters mounted thereon, means to reciprocate said cutters, an angularly adjustable work carriage, a series of work spindles rotatably mounted therein, an indexing mechanism, an index shaft, driving connections therefrom to said indexing mechanism and other driving connections therefrom to said work spindles.

6. In a gear cutting machine, the combination with a revoluble cutter spindle, a series of cutters mounted thereon, means to reciprocate said cutters, an angularly adjustable work carriage, a series of work spindles rotatably mounted therein, an indexing mechanism, a shaft, driving connections therefrom to said indexing mechanism, other driving connections therefrom to said work spindles, and driving connections between said work spindles.

7. In a gear cutting machine, the combination with a revoluble cutter spindle, a series of cutters mounted thereon, means to reciprocate said cutters, an angularly adjustable work carriage, a series of work spindles rotatably mounted therein, an indexing mechanism, driving connections between said indexing mechanism and work spindles and driving connections between said work spindles.

8. In a gear cutting machine, the combination with a revoluble cutter spindle, a series of cutters mounted thereon, means to reciprocate said cutters, an angularly adjustable work carriage, a series of work spindles, rotatably mounted therein, a hinge shaft, an indexing mechanism, a shaft parallel to said hinge shaft and arranged to swing about said hinge shaft as a center, driving connections between shaft and work spindles, other driving connections between said shaft and hinge shaft and driving connections between said hinge shaft and indexing mechanism.

FREDERICK L. EBERHARDT.

Witnesses:
WM. F. ZIMMERMANN,
H. EZRA EBERHARDT.